United States Patent [19]
Kenmochi

[11] Patent Number: 5,760,923
[45] Date of Patent: Jun. 2, 1998

[54] RECORDING APPARATUS WITH PAPER FORM DISCRIMINATOR

[75] Inventor: Toshio Kenmochi, Yokohama, Japan

[73] Assignee: Canon Kabushiki Kaisha, Japan

[21] Appl. No.: 576,043

[22] Filed: Dec. 21, 1995

Related U.S. Application Data

[63] Continuation of Ser. No. 229,713, Apr. 19, 1994, abandoned.

[30] Foreign Application Priority Data

Apr. 28, 1993 [JP] Japan .................... 5-102747

[51] Int. Cl.$^6$ .................... H04N 1/32; H04N 1/40
[52] U.S. Cl. .................... 358/468; 358/401; 358/449
[58] Field of Search .................... 358/400, 401, 358/449, 451, 468, 498, 296; 355/308, 309, 311

[56] References Cited

U.S. PATENT DOCUMENTS

| 4,731,658 | 3/1988 | Koseki | 358/451 |
| 4,855,839 | 8/1989 | Saito | 358/449 |
| 5,072,306 | 12/1991 | Matsumoto et al. | 358/449 |
| 5,150,224 | 9/1992 | Mizude et al. | 358/451 |

*Primary Examiner*—Thomas D. Lee
*Attorney, Agent, or Firm*—Fitzpatrick, Cella, Harper & Scinto

[57] ABSTRACT

A recording apparatus having a single recording paper insertion section through which one of at least two different forms of recording paper, such as roll paper and cut paper, can be fed into the apparatus. The apparatus includes a recording paper discrimination device arranged to discriminate among at least two different forms of recording paper without using detection devices for detecting the individual forms of recording paper or a selection device allowing the user of the apparatus to select the one form.

14 Claims, 6 Drawing Sheets

RECORDING APPARATUS WITH PAPER FORM DISCRIMINATOR

This application is a continuation of application Ser. No. 08/229,713 filed Apr. 19, 1994, now abandoned.

BACKGROUND OF THE INVENTION

1. Field of the Invention

The present invention relates to recording apparatuses and facsimile equipment.

2. Related Background Art

Some of the conventional recording apparatuses are capable of using recording paper in the form of both cut sheets of paper (hereinafter referred to as "cut paper") and rolls of paper (hereinafter referred to as "roll paper"). Such recording apparatuses, however, differ in the way to handle the two types of recording paper. The apparatuses may have no means for discriminating between cut paper and roll paper. In other cases, the apparatus is arranged to detect which type of recording paper is set, and detection means are provided separately for detecting each of the paper types. In still other cases the apparatus may have a selection means such as a selection switch for selecting one of the paper types.

Conventional apparatuses having no discrimination means have the following disadvantage: when recording information on an original longer by 1 cm or thereabout than an A4 size original, although data at the trailing end of the original can be recorded if roll paper is used, the trailing-end data may not be recorded properly or at all if cut paper is used. When separate detection means are provided for the individual types of recording paper, this increases production cost. When a selection switch or the like is provided, this necessitates setting by the user, which may be troublesome.

SUMMARY OF THE INVENTION

A primary object of the present invention is to improve recording apparatuses in view of the above-described problems.

Another object of the present invention is to provide a recording apparatus into which recording paper can be manually fed by the operator, the recording apparatus being capable of automatically determining whether cut paper is set or roll paper is set.

In accordance with these objects, there is provided a recording apparatus with a recording paper insertion section adapted to receive at least first and second forms of recording paper, the first and second forms of recording paper being different from one another, a recording paper discrimination means for automatically discriminating between the first form and the second form of recording paper, the discrimination means including a single detector for the automatic discrimination, and a recording means for recording on the recording paper.

DETAILED DESCRIPTION OF THE PREFERRED EMBODIMENT

An embodiment of the present invention will now be described with reference to the drawings.

Figure 1A:
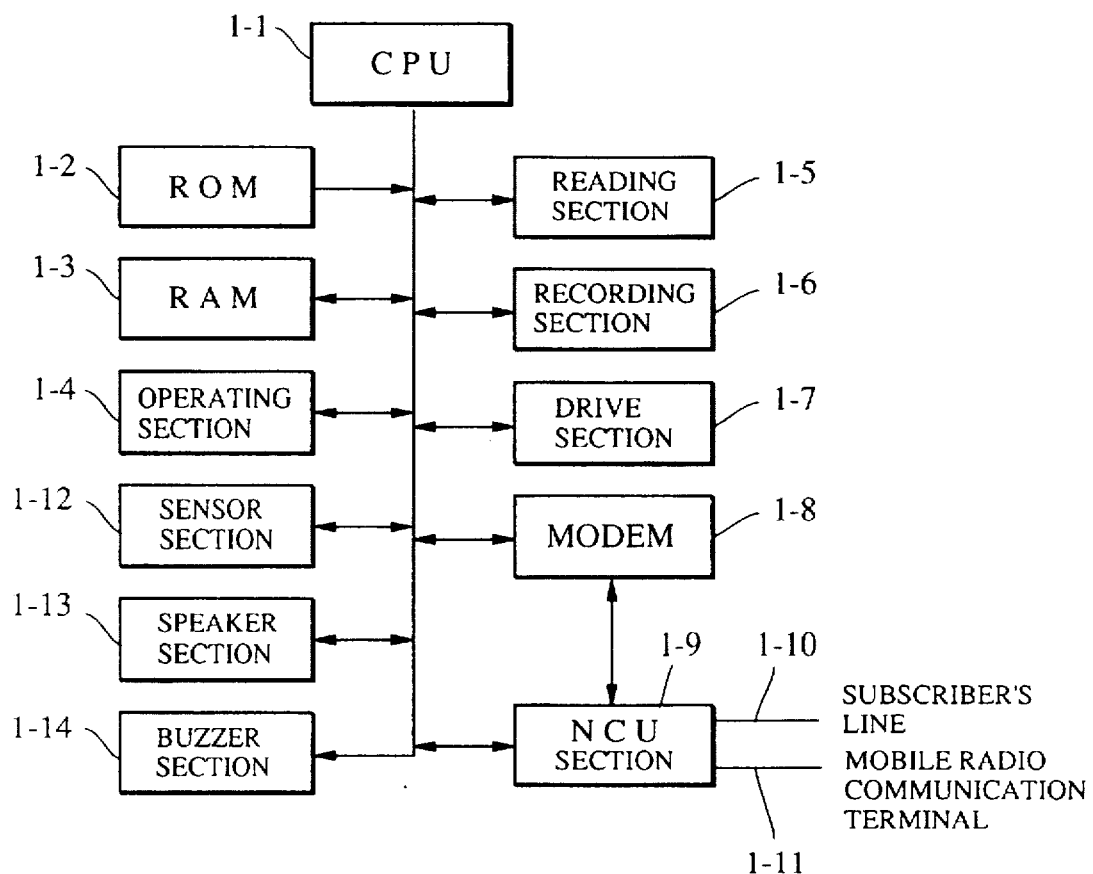
FIGS. 1A and 1B are block diagrams for explaining an embodiment of the present invention.
Figure 1B:
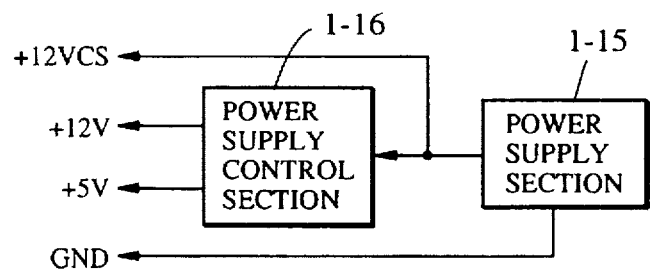

Facsimile equipment embodying the present invention has a main body accommodating a configuration shown in FIGS. 1A and 1B. Referring to FIGS. 1A and 1B, the configuration includes a central processing unit (CPU) 1-1 connected with a read-only memory (ROM) 1-2 and various sections of the equipment so that the entire equipment can be controlled in accordance with programs stored in the ROM 1-2. The equipment has the following sections: a random-access memory (RAM) 1-3; an operating section 1-4; a reading section 1-5; a recording section 1-6; a drive section 1-7; a modulator-demodulator (MODEM) 1-8; a network control unit (NCU) 1-9; a subscriber's line 1-10; a mobile communication terminal 1-11; a sensor section 1-12; a speaker section 1-13; a buzzer section 1-14; a power supply section 1-15; and a power supply control section 1-16.

The sections 1-3 to 1-16 will be described below.

The RAM 1-3 stores binary-coded image data after it has been read by the reading section 1-5, and stores binary-coded data to be recorded by the recording section 1-6. The RAM 1-3 also stores binary-coded data to be modulated by the MODEM 1-8 so that the stored modulated data can be output through the NCU section 1-9 to, for example, the subscriber's line 1-10. In addition, the RAM 1-3 stores binary-coded data obtained by inputting analog waveforms through the NCU section 1-9 from, for example, the subscriber's line 1-10. The MODEM 1-8 then demodulates the analog waveforms stored in RAM 1-3.

The operating section 1-4 principally includes: a start key for starting a transmitting operation, a receiving operation and the like; mode keys for specifying image transmitting modes, such as a fine mode and a standard mode; a copy key for starting the copy operation; an economy key for entering an energy conservation mode when recording (printing) is to be performed by using a battery power supply; and a stop key for stopping an operation which has been initiated.

The CPU 1-1 detects depressed states of the keys in the operating section 1-4, and controls various sections of the equipment in accordance with the detected states.

The reading section 1-5 principally includes: a direct memory access (DMA) controller; an image sensor of a charge-coupled device (CCD) type or a contact type (CS); a transistor-transistor logic (TTL) IC; and a binary coding circuit. Under control of the CPU 1-1, the reading section 1-5 binarizes data read by the CCD or CS, and sequentially sends binary-coded data to the RAM 1-3.

The recording section 1-6 principally includes: a DMA controller; a thermal head for recording on B4 size or A4 size recording paper; and a TTL IC. Under control of the CPU 1-1, the recording section 1-6 reads data to be recorded from the RAM 1-3, and prints out the data in hard copies.

The drive section 1-7 principally includes: stepping motors for driving the reading section 1-5 and the paper feed and paper discharge rollers of the recording section 1-6; gears for transmitting the driving force of the motors; and driver circuits for controlling the motors.

The MODEM 1-8 principally includes: G3, G2, G1 and old-FM modems; and a clock generating circuit connected with these modems. Under control of the CPU 1-1, the MODEM 1-8 modulates data to be transmitted which is stored in the RAM 1-3, so that the data can be output to the subscriber's line 1-10 or to the mobile communication terminal 1-11 through the NCU 1-9. Further, under control of the CPU 1-1, the MODEM 1-8 inputs analog signal inputs from the subscriber's line 1-10 or the mobile communication terminal 1-11 through the NCU 1-9, demodulates the analog signal inputs into binary data, and stores the binary data in the RAM 1-3.

The MODEM 1-8 has a power save mode which can be entered under control of the CPU 1-1 so as to reduce the level of current consumed by the MODEM 1-8. In this mode, the level of current consumed by the MODEM 1-8 in a non-operating state is reduced to $\frac{1}{10}$ of the level normally consumed. When the MODEM 1-8 is in the power save mode, however, the equipment is not able to transmit or receive.

The NCU section 1-9 principally includes: a direct-current capturing circuit; a two-wire/four-wire conversion circuit; a reception circuit; a signal detection circuit; and a line switching circuit. The NCU 1-9 allows signals from the subscriber's line 1-10 and the mobile communication terminal 1-11 to be supplied to the MODEM 1-8.

The subscriber's line 1-10 and the mobile communication terminal 1-11 are connected to the NCU section 1-9, as described above.

The sensor section 1-12 principally includes: a recording paper width sensor; a recording paper presence/absence sensor; a recording paper end-mark sensor; an original width sensor; and an original presence/absence sensor. Under control of the CPU 1-1, the sensor section 1-12 detects statuses of originals and recording paper.

The speaker section 1-13 principally includes: a speaker; and a speaker drive device. Under control of the CPU 1-1, the driving of the speaker drive device is turned on and off. The speaker section 1-13 is used to output various signals on the subscriber's line 1-10 from the speaker, and output key-touch sounds, sound signals and communication signals for a mobile communication device connected with the mobile communication terminal 1-11.

The buzzer section 1-14 principally includes: a buzzer and a buzzer drive device. Under control of the CPU 1-1, the buzzer section 1-14 generates an alarm.

The power supply section 1-15 supplies power to various parts in the main body. The power supply section 1-15, which may have one of the three configurations shown in FIGS. 3A to 3C (these configurations will be described later), produces a 12 V direct current (DC) output and a ground (GND) output.

The power supply control section 1-16 principally includes: a series regulator; a switching regulator; a DC/DC converter; a photovoltaic device; and a metal oxide semiconductor field effect transistor (MOSFET). The power supply control section 1-16 converts 12 V DC input from the power supply section 1-15 into a 5 V DC output. The power supply control section 1-16 is constructed to control the outputs of the power supply section 1-15 on the basis of signals from the CPU 1-1.

The power supply section 1-15 and the power supply control section 1-16 have the following output sequence: first, +12 VCS is generated, then +5 V is generated, and then +12 V is generated. The +12 V outputs can be turned on and off by the CPU 1-1.

Figure 2A:
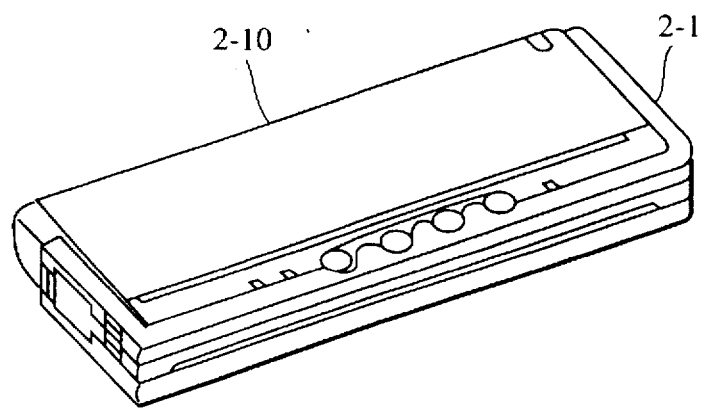
FIGS. 2A and 2B are other views for explaining the embodiment shown in FIGS. 1A and 1B.
Figure 2B:
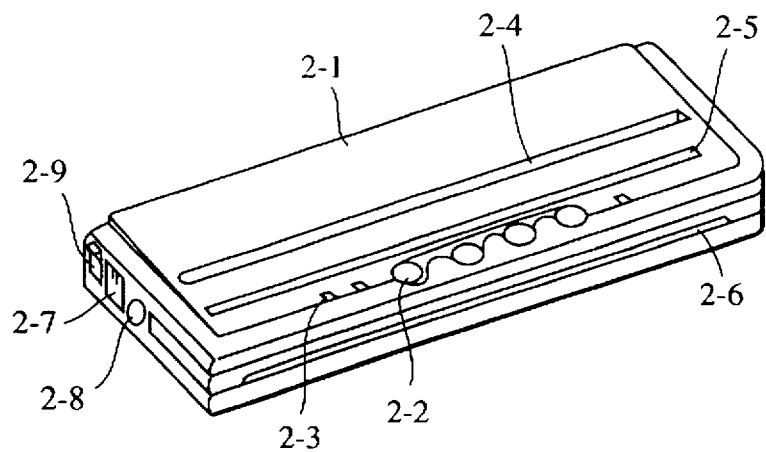

When the facsimile equipment is a portable, its main body has an external appearance as shown in FIGS. 2A and 2B.

Referring to FIG. 2B, a main body 2-1, having a configuration shown in FIGS. 1A and 1B, includes: an operating section 2-2; a display section 2-3; a recording paper insertion section 2-4 through which recording paper in the form of either roll paper or cut paper can be inserted into the main body of the equipment; a recording paper discharge and original insertion section 2-5 through which the recording paper can be discharged and an original can be inserted; and an original discharge section 2-6 through which the original can be discharged. The main body 2-1 also includes first and second connecting sections 2-7 and 2-8 for respectively connecting the main body of the equipment with a subscriber's line and a mobile communication terminal, such as those shown in FIG. 1A. A switch 2-9 is provided to turn on and off a power supply, such as that shown in FIG. 1B. As shown in FIG. 2A, a holder 2-10 for holding roll paper is assembled on the main body proper 2-1.

Figure 3A:
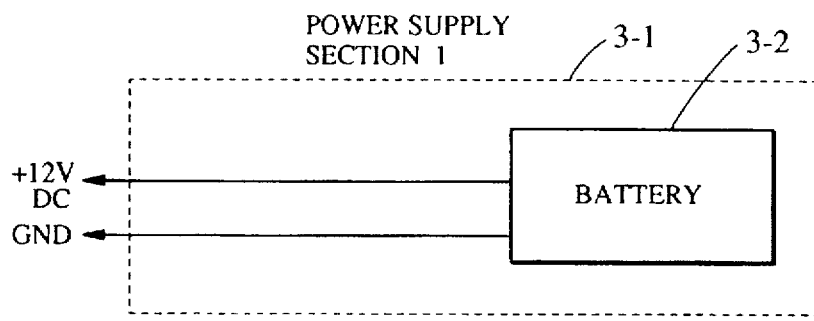
FIGS. 3A to 3C are still other views for explaining the embodiment.
Figure 3B:
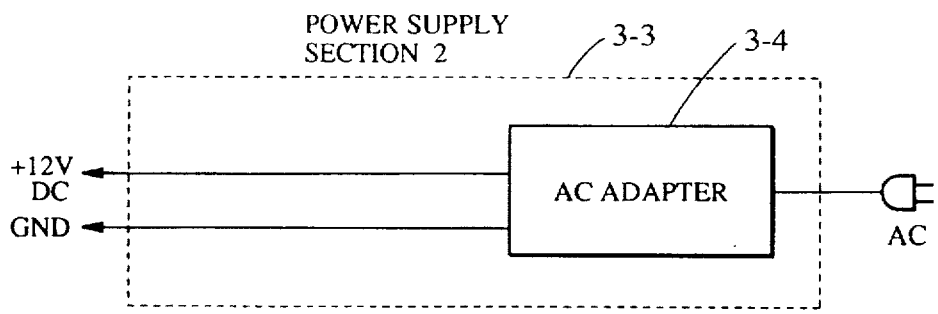
Figure 3C:
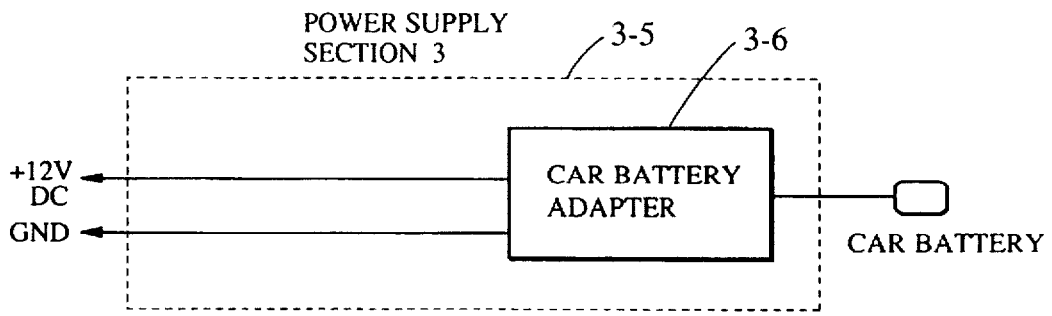

As stated above, the power supply section of the facsimile equipment may be configured as shown in FIG. 3A, 3B or 3C.

Referring to FIG. 3A, a power supply section 3-1 comprises a 12 V DC battery 3-2, which supplies 12 V DC voltage to various parts in the main body.

Referring to FIG. 3B, a power supply section 3-3 comprises an alternating current (AC) adapter 3-4 connected to an AC power supply for converting AC input from this power supply into a 12 V DC output so as to supply 12 V DC voltage to various parts in the main body.

Referring to FIG. 3C, a power supply section 3-5 comprises a car battery adapter 3-6 connected to a car battery for converting DC input from this battery into stable 12 V DC current, so as to supply voltage of 12 V DC to various parts in the main body.

The operation of the facsimile equipment having the above construction will be described in detail with reference to flowcharts provided in FIG. 4 and FIG. 5. Operations shown in the flowcharts are stored in ROM 1-2 as programs to be executed by the CPU 1-1.

Figure 4A:
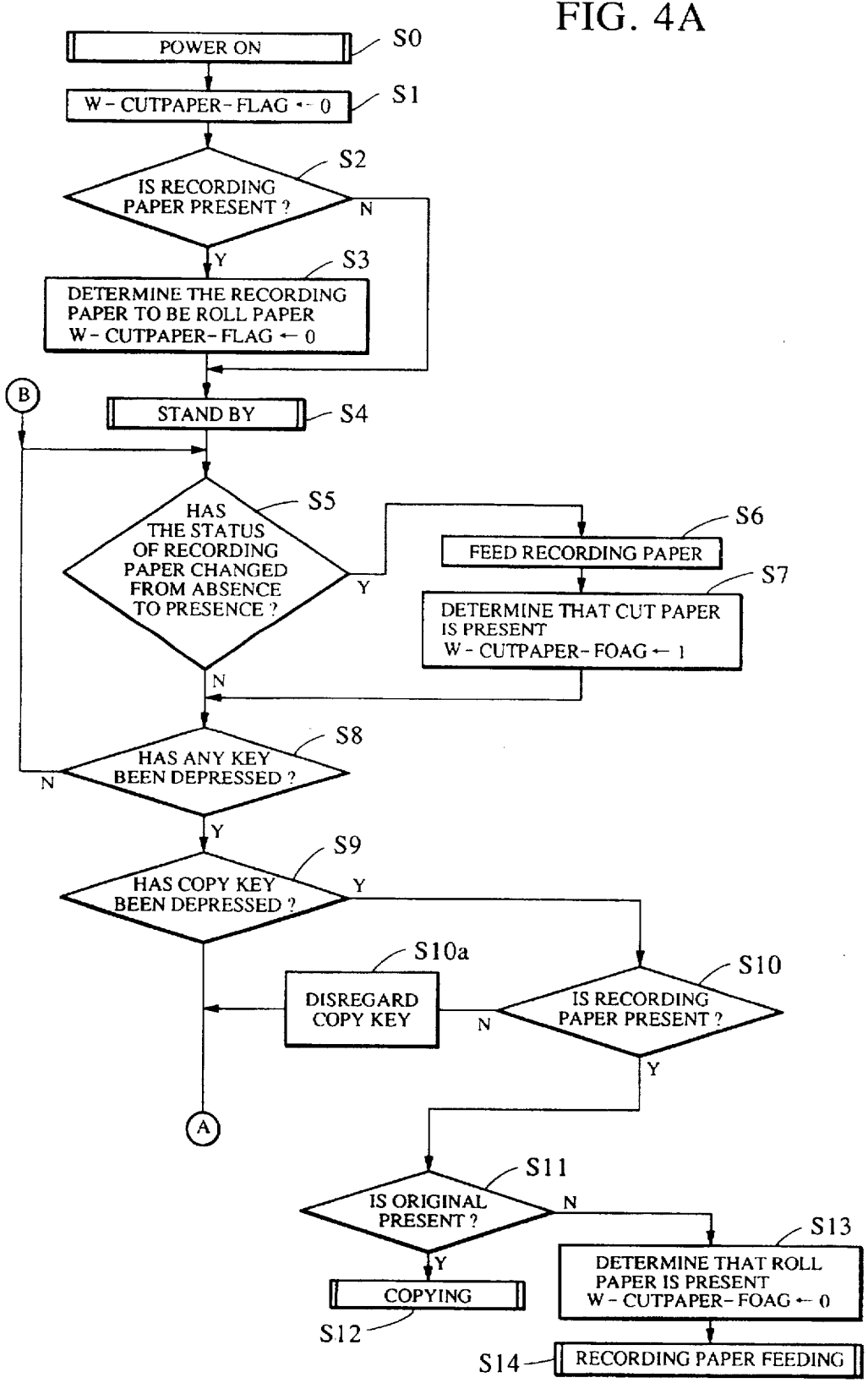
FIGS. 4A and 4B are a flowchart for explaining the operation of the embodiment.

Referring to FIG. 4A, when the power supply is actuated, "power on" software is executed in step S0. In step S1, a flag "w-cutpaper-flag" (hereinafter referred to as "the cut paper flag"), which is stored in the RAM 1-3 to determine whether the recording paper being used is roll paper or cut paper, is initialized to "0". Then, in step S2, on the basis of the results of detection of a recording paper presence/absence sensor, a determination is made regarding whether recording paper is present or not when the power supply is actuated. If recording paper is present, step S3 is executed. In step S3, the cut paper flag is cleared to "0", and the recording paper being used is identified as roll paper.

Subsequently, in step S4, "stand by" software for detecting actuation of various keys, is entered. In step S5, it is determined whether or not the status of recording paper has changed from its absence to its presence. If there has been such a change in the recording paper status, steps S6 and S7 are executed. In step S6, the recording paper is fed to the printing position of the equipment. In step S7, it is determined whether the recording paper being used is cut paper, and, if so, the cut paper flag is set to "1".

Subsequently, in step S8, it is determined whether the copy or start key has been actuated. If, the determination is affirmative, in step S9, it is determined whether the copy key has been actuated and if it has, step S10 is executed to determine whether or not recording paper is present. If, in step S10, it is determined that recording paper is present, step S11 is executed. However, if it is determined in step S10 that recording paper is not present, in step S10a the depression of the copy key is disregarded. In step S11, it is determined whether an original is present. If an original, as well as recording paper, is present, copying is effected in step S12. On the other hand, if no original is present while recording paper is present, a mode for feeding the recording paper should be entered. Such a case occurs mainly when roll paper, which has just been set on the roll paper holder 2-10 by the operator, needs to be fed. Accordingly, steps S13 and S14 are executed. In step S13, the recording paper being used is determined to be roll paper, and the cut paper flag is cleared to "0". In step S14, the recording paper is fed.

On the other hand, if, in step S15 (see FIG. 5), it is determined that the key depression detected in step S8 is a depression of the start key, step S16 is executed. In step S16, it is determined whether an original is present. If an original is present, transmission is effected in step S17. If no original is present, step S18 is executed to determine whether or not recording paper is present. If recording paper is also not present, the depression of the start key is disregarded. On the other hand, if recording paper is present though no original is present, reception is effected in step S 19.

Thus, the CPU 1-1 is arranged to automatically discriminate roll paper from cut paper by determining that the recording paper being used is roll paper if recording paper is present when the power supply is actuated, that the recording paper being used is cut paper when the recording paper is set in its printing position after an actuation of the power supply, and that the recording paper being used is roll paper when recording paper has been supplied by the operator.

Next, differences in the operation of the equipment between when the recording paper being used is roll paper and when the recording paper being used is cut paper will be described with reference to FIG. 5.

Figure 4B:
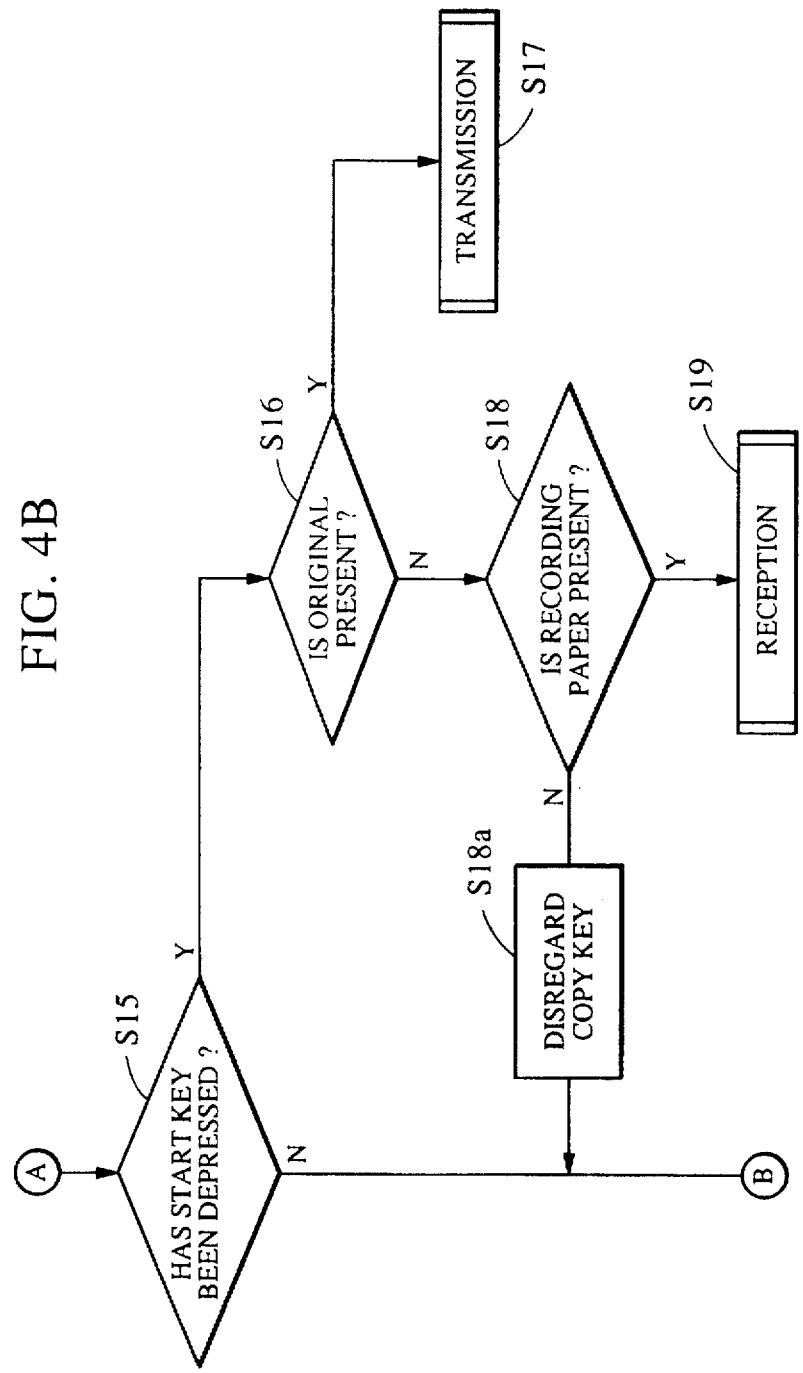
Figure 5:
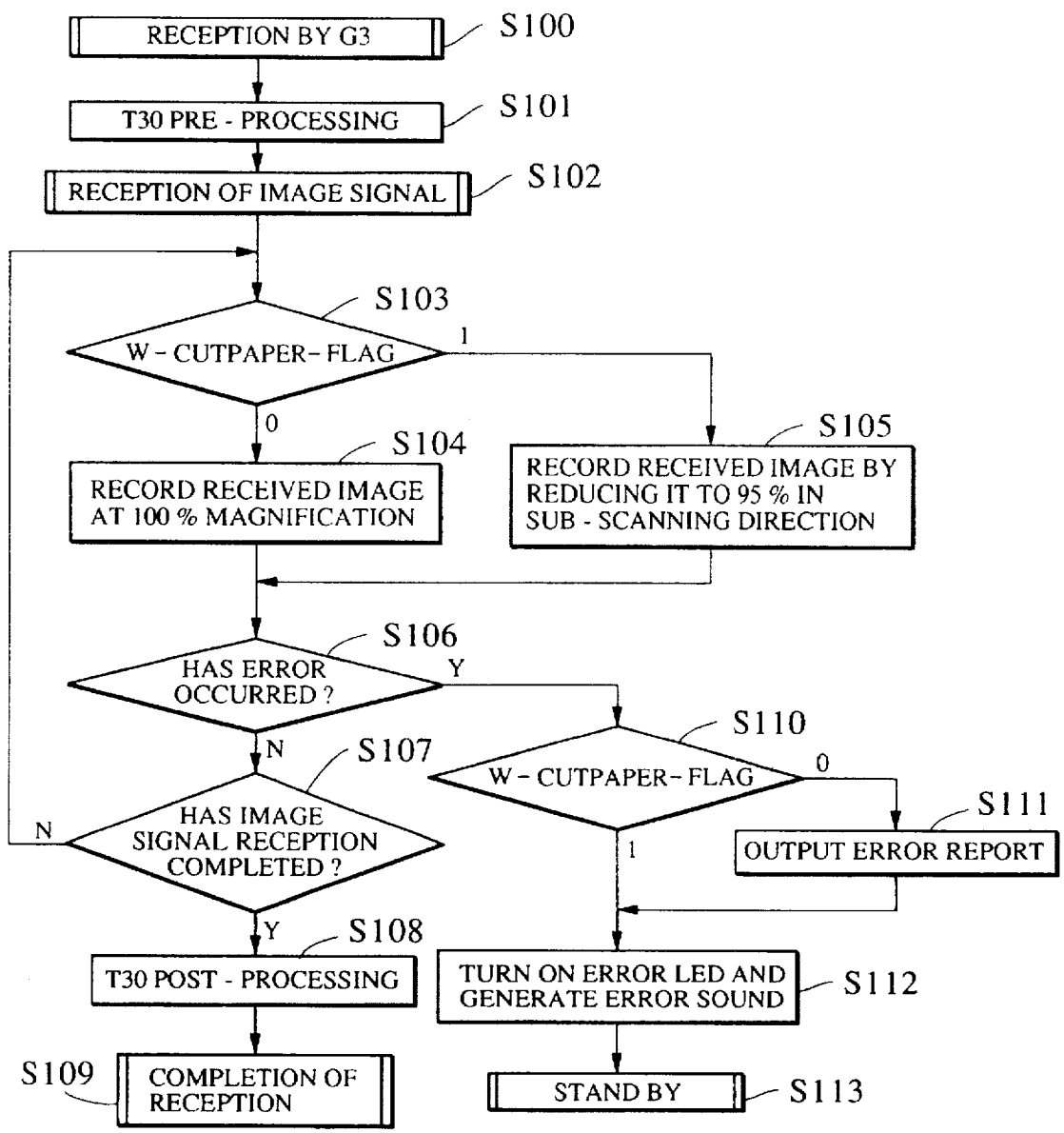
FIG. 5 is still another flowchart for explaining the operation of the embodiment.

After a reception operation has been entered in S19 shown in FIG. 4B, that is, after the execution of step S100 shown in FIG. 5, step S101 is executed. In step S101, preprocessing, as prescribed in T30 by the International Telegraph and Telephone Consultative Committee (CCITT), is executed until an image signal is received. Then, in step S102, flows for image signal reception are entered. In step 102, image data is received from the opposite station. In step S103, the cut paper flag is checked. As a result, if the recording paper being used is roll paper, step S104 is executed in which the image received is recorded at a direct or 100% magnification. On the other hand, if the recording paper being used is cut paper, step S105 is executed and the image received is recorded by reducing the image to 95% thereof in the sub-scanning direction. The reduction to 95% is accompanied by omitting one driving operation of the relevant motor per each twenty driving operations of the same.

If no error occurs during the image signal reception (Step S106 ), post-processing for facsimile communication prescribed in T30 is executed in step S108 after the completion of the image signal reception has been determined in step S107 by detecting a return-to-control (RTC) signal prescribed by CCITT. Thereafter, the reception operation is completed in step S109.

If, in step S106, it is determined that an error has occurred during the reception of the image signal, step S110 is executed. In step S110, the cut paper flag is checked to determine whether the recording paper being used is roll paper or cut paper. If the cut paper flag indicates that roll paper is used, step S111 is executed, so that error report is recorded on the recording paper. Then, in step S112, an error light emitting diode (LED) of the equipment is turned on and an error sound is generated by the buzzer. Thereafter, the facsimile equipment returns to a stand-by condition.

On the other hand, if cut paper is used, no error report is output, and step S112 is executed directly after the execution of step S110, which is also followed by returning to a stand-by condition.

As has been described above, whether the recording paper being used is cut paper or roll paper is automatically determined by using a single recording paper presence/absence detecting means, i.e., the recording paper presence/absence sensor. Since roll paper and cut paper can be discriminated from each other by using the single recording paper presence/absence sensor, it is possible to reduce production costs.

By virtue of automatic discrimination, an arrangement in which a received image is recorded by reducing the image to 95% when cut paper is used, is possible. This arrangement is advantageous because: when receiving images of an A4 original transmitted by a facsimile system etc., if A4 cut paper is used in the receiving equipment, and simultaneously if the transmitted image includes added information, such as the abbreviated name of the sending party, the name of the operator on the transmitting equipment, or a page number, so that the transmitted image is longer than the A4 size, the transmitted information may not be completely recorded on one sheet of A4 size cut paper and may be partly omitted or be recorded on two sheets. In contrast, if the transmitted information is recorded by 95% reduction, the information can be received properly on one sheet. The above arrangement is combined with an arrangement in which, when roll paper is used, transmitted information is recorded at a direct magnification.

Automatic discrimination between roll paper and cut paper enables another arrangement. A relatively short report, such as error report which is output when an error interruption has occurred, is not output on cut paper. This makes it possible to prevent recording paper waste.

While the present invention has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A recording apparatus comprising:

recording means for recording on recording paper;

a recording paper insertion section adapted to receive at least first and second forms of recording paper, the first and second forms of recording paper being different from one another;

power supply means for supplying power to said apparatus; and recording paper discrimination means for automatically discriminating which of the first form and the second form of recording paper is being received by said recording paper insertion section, said discrimination means including a single detector for accomplishing the automatic discrimination, and for further discriminating whether or not a recording paper is set in said recording paper insertion section, wherein said recording paper discrimination means discriminates between the first form and the second form of recording paper at a first timing, the first timing being a timing corresponding to actuation of said power supply means, and discriminates whether or not the recording paper is set in said recording paper insertion section at a second timing which is different from the first timing.

2. A recording apparatus according to claim 1, wherein the first form of recording paper is roll paper and the second form of recording paper is cut paper.

3. A recording apparatus according to claim 2, wherein said discrimination means determines that the recording paper is roll paper if recording paper is detected when said power supply means is actuated, and wherein said discrimination means determines that the recording paper is cut paper if recording paper is not detected when said power supply means is actuated and is detected thereafter.

4. A recording apparatus according to claim 2, wherein said recording means records information at different magnifications dependent on whether the information is to be recorded on roll paper or to be recorded on cut paper.

5. A recording apparatus comprising:

a recording paper insertion section adapted to receive at least first and second forms of recording paper, the first and second forms of recording paper being different from one another;

recording paper discrimination means for automatically discriminating which of the first form and the second form of recording paper is being received by said recording paper insertion section, said discrimination means including a single detector for accomplishing the automatic discrimination;

recording means for recording on the recording paper; and power supply means for supplying power to the apparatus, wherein said discrimination means determines that the recording paper is the first form if recording paper is detected when said power supply is actuated, and wherein said discrimination means determines that the recording paper is the second form if recording paper is not detected when said power supply is actuated and is detected thereafter.

6. A recording apparatus according to claim 5, wherein the first form of recording paper is roll paper and the second form of recording paper is cut paper.

7. A recording apparatus according to claim 6, wherein said recording means records information at different magnifications dependent on whether the information is to be recorded on roll paper or to be recorded on cut paper.

8. A recording method comprising:

inserting a recording paper into an insertion section of a recording apparatus adapted to receive at least first and second forms of recording paper, the first and second forms of recording paper being different from one another;

discriminating whether the inserted recording paper being received by the recording paper insertion section is the first form or the second form of recording paper, wherein a single detector is used to accomplish said discriminating step;

discriminating whether a recording paper is set in the recording paper insertion section; and recording on the recording paper, wherein the discriminating between the first form and the second form of recording paper is at a first timing, the first timing being a timing corresponding to actuation of a power supply for supplying power to the recording apparatus, and the discriminating whether the recording paper is set in the recording paper insertion section is at a second timing which is different from the first timing.

9. A recording method according to claim 8, wherein the first form of recording paper is roll paper and the second form of recording paper is cut paper.

10. A recording method according to claim 9, further comprising the steps of actuating the power supply and discriminating whether the recording paper is roll paper if recording paper is detected when the power supply is actuated, and discriminating whether the recording paper is cut paper if recording paper is not detected when the power supply is actuated and is detected thereafter.

11. A recording method according to claim 9, wherein recording on the recording paper is done at different magnifications dependent on whether the information is to be recorded on roll paper or to be recorded on cut paper.

12. A recording method comprising:

actuating a power supply to a recording apparatus;

inserting into a recording paper insertion section of the apparatus one of at least first and second forms of recording paper, the first and second forms of recording paper being different from one another;

automatically discriminating which of the first form and the second form of recording paper is being received by the recording paper insertion section, wherein a single detector is used to accomplish said discriminating step;

determining that the recording paper is the first form if recording paper is detected when the power supply is actuated and determining that the recording paper is the second form if recording paper is not detected when the power supply is actuated and is detected thereafter; and recording on the recording paper.

13. A recording method according to claim 12, wherein the first form of recording paper is roll paper and the second form of recording paper is cut paper.

14. A recording method according to claim 13, wherein the recording is of information at different magnifications dependent on whether the information is to be recorded on roll paper or to be recorded on cut paper.

* * * * *